March 1, 1949.  W. GORDON  2,463,263
QUICK-ACTING SCREW ACTUATED CLAMPING DEVICE
Filed Feb. 15, 1945
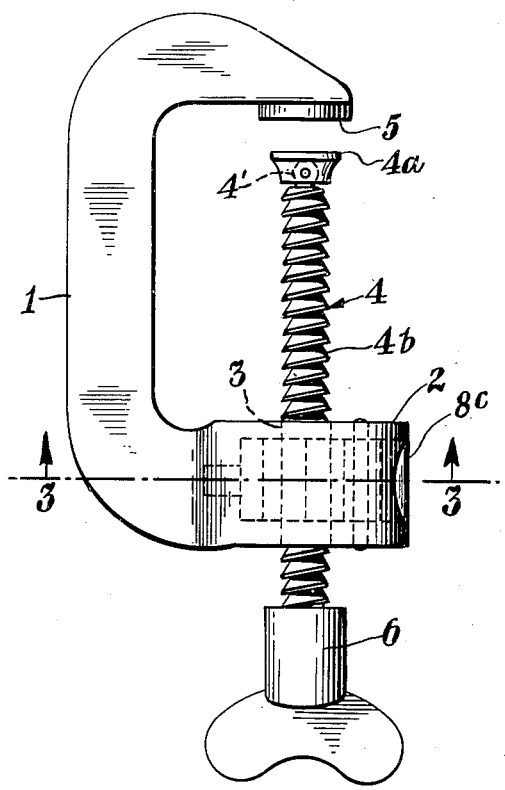
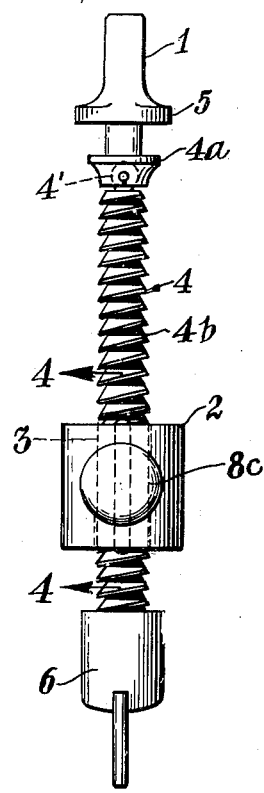
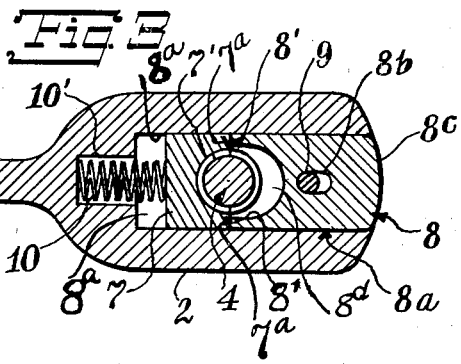
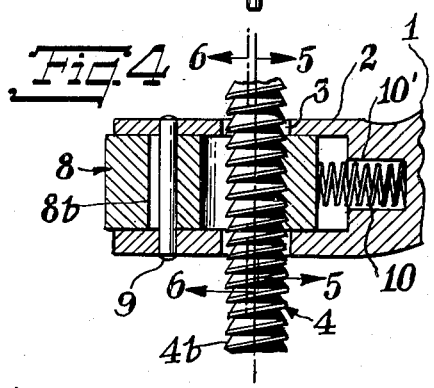
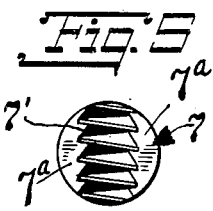
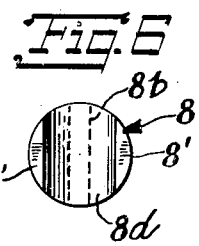
INVENTOR.
William Gordon
BY
Joseph F. O'Brien
Attorney Patented Mar. 1, 1949

2,463,263

UNITED STATES PATENT OFFICE 2,463,263

QUICK-ACTING SCREW ACTUATED CLAMPING DEVICE

William Gordon, Union City, N. J.

Application February 15, 1945, Serial No. 577,973

2 Claims. (Cl. 74—424.8)

This invention relates to improvements in quick-acting screw-actuated clamping devices.

More particularly my invention relates to that type of clamping devices such as C-clamps, rigger splicing devices and the like in which the actuating-screw meshes with a threaded bearing including a sectional nut adapted to mesh with the actuating screw and to be manually released therefrom.

In earlier constructions, the quick-acting sectional nut and the operating member therefor, when made in the desirable cylindrical form, have a certain degree of looseness and a tendency to tilt out of true vertical alignment, and unless very accurately fitted may result in a wearing of the screw and nut members or of the sectional nut itself, and a partial binding that reduces the facility and ease of operation of releasing the sectional nut, particularly when the screw and nut are moved in a ratchet-like movement.

One of the objects of this invention is to improve the nut and screw operation of devices of the character specified and particularly relieve the nut from the weight and necessity of carrying of the manually-actuated operating member and also to provide means for positively aligning and retaining in operative position at all times the quick-acting sectional nut and the manually-actuated means for actuating the same.

Another object of my invention is, in a device of the character specified, to utilize a cylindrical sectional nut independent of its operating element and to provide the nut with a longitudinal thread adapted to interengage the screw of the clamp and having face portions at opposite sides of the screw adapted to be engaged by an operating member and retained in proper position and alignment with the threads of the screw, and to utilize such a sectional nut in combination with actuating means that is retained in positive alignment with the actuating screw and its bearing and that is adapted to retain the nut in similar positive alignment.

Another object of my invention is to provide a bearing construction in which the operating member is provided with an aligning slot disposed radially of the screw and the bearing is provided with a vertical pin passing through this slot and so arranged that the operating member will always be retained in proper vertical alignment and will have abutting faces adapted to abut and engage similar faces on the sectional nut to hold the same in proper alignment with the screw.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in side elevation of a screw clamp embodying my invention;

Fig. 2 is a view in front elevation of the clamp shown in Fig. 1;

Fig. 3 is a section on the line 3—3 of Fig. 1 looking in the direction of the arrows;

Fig. 4 is a section on the line 4—4 of Fig. 2 looking in the direction of the arrows;

Fig. 5 is a view of the screw-engaging end of the sectional nut substantially on the line 5—5 of Fig. 4; and Fig. 6 is a view of the inner face of the operating member substantially on the line 6—6 of Fig. 4.

Referring now to these drawings, which illustrate a preferred embodiment of my invention as applied to C-clamps, 1 indicates a conventional clamp body embodying my improved screw-bearing 2 which is provided with a screw-guiding and retaining bore 3 through which a clamping or pressure-applying screw 4 passes co-axially and is movable to apply screw-pressure on a piece of work between a capped end 4ª of the said screw and a relatively stationary terminal or jaw 5 when a handle 6 is turned by hand or otherwise. As shown, the screw 4 is provided with a conventional cap 4ª having a socket fitting over the ball-shaped end 4' of the screw, the walls of the socket being kerfed to allow contraction, and when positioned, may be squeezed on the end of the screw to mount the cap so that it will have a rocking movement thereon. The cap is larger than the screw-guiding bore 3 and the screw is thus locked in place on one end within the clamp body 1 while at the opposite end the screw is locked against separation by the handle 6.

A section of the bearing 2 is cut away and is modified and changed from the conventional threaded screw-bearing in order to provide for the insertion therein of the quick-acting mechanism or sectional nut and its actuating means.

The conventional screw-threaded bearing is replaced by a longitudinally disposed smooth walled screw-guiding and retaining bore 3 of cylindrical conformation that is small enough to guide the screw and large enough to enable free passage and movement of the screw therethrough, and a part of said smooth walled screw-guiding bore is cut away or removed intermediate its ends and replaced by a sectional-nut 7 adapted to be moved into and out of intermeshing engagement with the screw 4 to enable such quick-acting movement of the said screw through its bearing to clamping and released positions respectively.

In accordance with the preferred form of my invention illustrated, the bearing 2 is provided with a transverse bore 8ª for mounting and seating a sectional nut or bearing element 7 which is separated from and independent of its operating member or element 8. The transverse bore, as shown, is disposed at a right angle to the bore 3, extends across said bore and is preferably of larger size than the same. This bore 8ª is utilized for the mounting of my said threaded element 7 at one side of the screw 4 and its operating member 8 at the opposite side thereof, though in the construction shown, the sectional nut and its operating element may be mounted initially and the screw then passed through.

As shown, the sectional nut 7 comprises a cylindrical body portion provided on its inner face with a diametric transverse sectional thread 7' adapted at its widest portion to engage a segment amounting to half of the screw. Said sectional nut 7 is provided with contact faces 7ª—7ª on opposite sides of the thread 7', and is normally pressed toward the screw and into intermeshing engagement with the threads thereof by a spring 10 which is preferably seated in a narrow bore 10' positioned at the inner or rear end of the bore 8ª. When the screw-thread of the sectional-nut 7 is in mounted position the contact faces 7ª—7ª will extend parallel and radial to the axis of the screw, and I provide an operating member 8 seated in the outer part of the bore 8ª and provided at its inner end with contact faces 8'—8' adapted to flatly abut against the contact faces 7ª—7ª of the sectional nut. The operating member 8 is itself prevented from tilting or rotating in the socket 8ª in a direction transverse to the operating movement of the member 8. This is accomplished by providing in the member 8 a vertically-disposed slot 8ᵇ and passing therethrough a guide pin 9 fixedly mounted in the bearing at opposite ends of the operating member. Pin 9 and slot 8ᵇ being adapted to fit closely when the member 8 is in position with the contact surfaces 8'—8' in alignment with the axis of the screw and in abutment with similarly aligned contact surfaces 7ª—7ª of the sectional nut the parts will be held in alignment. Obviously these aligning parts will positively retain the operating member 8 at all times in a given adjusted position which, of course, will be such as to produce proper alignment of the screw threads 7' of the nut 7 with the screw threads 4ᵇ of the screw and will also permit movement of the sectional nut independent of the operating member when the screw and nut are caused to function like a ratchet as hereinafter specified.

In the embodiment shown, the operating element 8 is provided with a finger-engaging surface 8ᶜ which is rounded, arranged flush with the adjacent surfaces of the bearing and is operable by depression from the surrounding surfaces and back again so that it never projects above said surrounding surfaces. The said operating member 8 is provided between the contact surfaces 8'—8' with a vertical channel 8ᵈ of suitable depth to permit the inward movement of the member 8 and the slot 8ᵇ also has a suitable depth to the action of the spring and which will completely release the nut from the spring, and this guiding pin and slot will also definitely limit the inward movement of the operating member 8 to prevent any contact between the channel 8ᵈ and the screw.

My sectional nut element is adapted to cooperate with any type of screw and in all cases the screw may be readily, quickly and positively released for quick operation without any possibility of jamming or tilting by a mere pressing down of the finger of the user on the outer surface 8ᶜ of the plug. Such pressure will compress the spring 10 and positively move the threads of the sectional nut away from the screw, whereupon the screw may be freely moved in any direction instead of being moved through the slow manual screw-operation which is necessary on conventional devices of the character specified.

My sectional bearing element is, however, particularly adapted to cooperate with buttress screws of the type shown in Figs. 1, 2 and 4 of the drawing and when such screws are used a great saving of time and very quick-actuation is possible because the parts will be so arranged that direct manual pressure applied in a rectilinear line instead of by turning may be applied to the screw. Thus, when my improved screw-bearing is used with the conventional screw, finger pressure upon the surface 8ᶜ will release the screw from engagement with the threads 7' of the sectional threaded nut 7 and the screw may be then freely moved in either direction through the bearing 2, resulting in the avoidance of the screwing movement necessary in conventional screw threaded bearings and a consequent saving in time. When, however, my improved clamp has a screw of the buttress type shown in Figs. 1, 2 and 4, in which the threads have an inclination to the axis of the screw and the threads of the sectional nut 7 have a complementary pitch, it will be seen that the threads 7' will by pressure of the spring 10 be forced yieldingly into intermeshing engagement with the threads of the said screw and the inclination of the screw thread and threads of the threaded sectional nut are such that the spring-pressed sectional element will function like a pawl and with screws of this type, direct manual pressure may be applied in an inward rectilinear direction on the threaded screw or on the handle thereof to permit an inward clamping movement of said screw. An automatic pawl-like releasing or disengagement of the threads of the sectional element from the threads of the screw will result from the application of such direct manual pressure and the threads of the screw will click thereover so as to enable the screw to be moved instantaneously and without operation of the releasing member to approximately work clamping position. The making of the sectional nut 7 in a separate piece from the operating member 8 permits a more facile movement or projection of the screw in such rectilinear movement than would be possible if the sectional nut and operating element 8 were in one piece. When the approximate position hereinabove specified is reached a short turn on the screw handle of approximately a quarter of a revolution will enable a tightening up of the screw on the work. When so tightened, the sectional nut becomes set and the operating element 8 will be fixed at its outer limit of movement and cannot be operated until the permit an operating movement inwardly against screw is given a short releasing turn. This setting or locking of the sectional nut is due to the tight frictional engagement of the intermeshing threads when the screw is in clamping engagement with a piece of work. Thus, when the end of the screw is moved into tight clamping engagement with a piece of work, there will be a frictional back pressure through the threads of the screw on the threads of the sectional nut proportional to the clamping pressure of the screw on the work, and when the screw is properly clamped on a piece of work this back pressure will cause an interlocking frictional engagement between the threads on the sectional nut and the threads of the screw so that the nut will be forced downwardly against the wall of its housing aperture in the screw-bearing and clamped in place, and this clamping of the sectional nut positively locks it against any disengaging manual movement of the member 8, so that a secure, interlocking engagement similar to the interengagement of a lock-nut results. The member 8 thus cannot be positively operated while the screw is functioning to apply pressure to a piece of work. The tightening movement of the screw consequently not only performs the function of clamping the object, but also by reverse pressure clamps and locks the sectional nut in its housing, so as to lock and prevent any releasing movement thereof during the clamping operation of the screw clamp. This final clamping of a piece of work and the locking of the sectional nut threads against releasing movement can be accomplished only by a turning movement of the screw for a quarter turning as hereinabove specified.

Having described my invention I claim:

1. A screw-actuated clamping device comprising a supporting body, a screw, a screw-mounting bearing for said screw comprising a bearing portion having a smooth-walled screw-guiding bore disposed co-axially with the screw and a transverse aperture communicating with said screw-guiding bore, a threaded sectional nut mounted in said transverse aperture and movable into and out of engagement with the screw when passing through said screw-guiding bore, resilient means for normally pressing said threaded element into intermeshing engagement with the screw, manually-engageable means for moving said threaded element out of engagement therewith, and a guiding pin and slot connection between said manually engaging means and said bearing for preventing tilting movement of said engaging means in a plane transverse to the operating movement thereof and positively limiting the extent of inward movement of the same, said sectional nut being formed separately and independently from the manually-engageable means.

2. A screw-actuated clamping device comprising a supporting body, a screw, a screw-mounting bearing for said screw comprising a bearing portion having a smooth-walled screw-guiding bore disposed co-axially with the screw and a transverse aperture communicating with said screw-guiding bore, a threaded sectional nut mounted in said transverse aperture and movable into and out of engagement with the screw when passing through said screw-guiding bore, resilient means for normally pressing said threaded element into intermeshing engagement with the screw, manually-engageable means for moving said threaded element out of engagement therewith, and a guiding pin and slot connection between said manually engaging means and said bearing for preventing any tilting movement of said engaging means and positively limiting the extent of inward movement of the same, the sectional nut being cylindrical in conformation and formed separately and independently from the manually engageable means and provided with radial contact surfaces in contact with similar contact faces on the manually-engageable means.

WILLIAM GORDON.

REFERENCES CITED

The following references are of record in the file of this patent:

UNITED STATES PATENTS

| Number | Name | Date |
| --- | --- | --- |
| 150,900 | Silver et al. | May 12, 1874 |
| 169,027 | Naumann | Oct. 19, 1875 |
| 616,823 | Card | Dec. 27, 1898 |
| 686,391 | Cox | Nov. 12, 1901 |
| 924,122 | Williams | June 8, 1909 |
| 1,229,753 | Karolle et al. | June 12, 1917 |
| 1,517,024 | Sibley et al. | Nov. 25, 1924 |
| 1,753,924 | Gordon | Apr. 8, 1930 |

Certificate of Correction

Patent No. 2,463,263.                                                   March 1, 1949.

WILLIAM GORDON

It is hereby certified that errors appear in the printed specification of the above numbered patent requiring correction as follows:

Column 4, line 75, strike out the words "permit an operating movement inwardly against" and insert the same after "depth to" in line 75, column 3;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*